United States Patent
Wagstaff et al.

(10) Patent No.: US 6,353,578 B1
(45) Date of Patent: Mar. 5, 2002

(54) PHASE ALIGNMENT FOR VECTOR AND COHERENT SIGNAL PROCESSING

(76) Inventors: Ronald A. Wagstaff, 304 Tumblebrook, Slidell, LA (US) 70461; Jackson A. Mobbs, 15235 O'Neal Rd. #27, Gulfport, MS (US) 39503

( * ) Notice: Subject to any disclaimer, the term of this patent is extended or adjusted under 35 U.S.C. 154(b) by 0 days.

(21) Appl. No.: 09/320,697

(22) Filed: May 27, 1999

(51) Int. Cl.[7] ............................................. G01S 3/808
(52) U.S. Cl. ...................... 367/125; 367/118; 367/124
(58) Field of Search ................................ 367/118, 124, 367/125, 129

(56) References Cited

U.S. PATENT DOCUMENTS

| 3,170,135 | A | | 2/1965 | Yagelowich |
| 3,292,177 | A | | 12/1966 | Brightman et al. |
| 3,416,083 | A | | 12/1968 | Ray |
| 3,657,659 | A | | 4/1972 | Johnson |
| 3,931,607 | A | | 1/1976 | Ingram |
| 4,955,003 | A | * | 9/1990 | Goldman .................... 367/125 |
| 5,317,543 | A | | 5/1994 | Grosch |
| 5,417,113 | A | | 5/1995 | Hartley |
| 5,495,427 | A | * | 2/1996 | Puma et al. ................ 367/125 |
| 5,559,756 | A | | 9/1996 | Connoly, Jr. |
| 5,568,154 | A | | 10/1996 | Cohen |
| 5,684,882 | A | | 11/1997 | Mahieux et al. |
| 5,732,045 | A | | 3/1998 | Wagstaff et al. |
| 5,781,460 | A | | 7/1998 | Nguyen et al. |

FOREIGN PATENT DOCUMENTS

DE    38832-678 A    3/1990    ................ 367/125

* cited by examiner

Primary Examiner—Ian J. Lobo

(57) ABSTRACT

The invention involves a computationally simple and fast method for aligning the phases of complex signals (real (in phase) and imaginary (quadrature) components) before performing a coherent (in phase components) or vector sum, thus achieving the high gains of in phase summations without pre-processing overhead to determine an optimum progression of phase shifts to enable in phase summations. The method of the invention for aligning the phases, without preprocessing to get an optimum set of phase shifts, uses the temporal relationship that exists in the phase angles of successive vectors that occur evenly spaced in time.

14 Claims, 7 Drawing Sheets

PHASE ALIGNMENT FOR VECTOR AND COHERENT SIGNAL PROCESSING

BACKGROUND OF THE INVENTION

The present invention relates to a signal process apparatus and method using generic coherent summation to create informational signals that are in complex form that can apply to passive systems or active systems, applicable to acoustic systems and optical, e.g. in lasers, in terms of light having an amplitude in phase for detection and or enhancing the reception of a laser beam.

It is desirable to provide an easy and rapid technique to align the successive, evenly spaced in time, temporally rotating complex vectors that represent such things as the complex acoustic pressures measured by a sonar hydrophone and spectrum analyzed by a fast Fourier transform (FFT), or the voltage of an electrical signal, in order that a coherent (in phase) calculation of the complex vectors can be accomplished. Phase aligned vector summations and coherent summations are expected to produce larger signal-to-noise ratio (SNR) than either incoherent (magnitude only) and unaligned vector summations because signals, e.g., continuous wave (CW) tonals, are usually more coherent than noise. However, the rotational nature of the complex signal vectors presents a problem in tracking the rotations and phase aligning the vectors to be summed. It is desirable to automatically track the rotations, phase align the vectors, and determine the magnitudes of the contributions to the vector summations. The phases of noise are random, and therefore, do not produce a sensible or trackable progression of noise vectors like that of the signal vectors. The complex signal vectors will generally line-up and contribute constructively to the coherent (using phase alignment) sum, while the complex noise vectors have random phase alignment and will both add to and subtract from the vector sum. This results in a SNR increase of the phase aligned summation over other methods of summation, such as an unaligned vector summation and an incoherent summation of the magnitudes.

In the past, one way of accomplishing such signal processing was through beam forming. It is understood that when forming a beam to look in a given direction or angular elevation, complex coefficients will derive out of the beam former. However, this is problematic because it destroys phase information. Such an algorithm assumes a phase shift of, for example, one degree, and then calculates an error, and then assumes a shift of two degrees and so on, going on up to 180 degrees. Using this method, a shift that renders the least error was used. But the problem with such a system is that it assumes and takes a lot of time and effort and preprocessing. Furthermore, it also assumes a constant shift for the whole time period, and this is not what actually occurs.

Accordingly, an object of the invention is to provide a computationally efficient method for accounting for systematic signal phase rotations.

Another object of the invention is to provide a computationally efficient method for accounting for phase rotations and doing a phase aligned vector summation of the magnitudes (or magnitudes to an given exponent) of the vectors.

Still another object of the invention is to provide a computationally efficient method for accounting for phase rotations and doing a phase aligned "coherent" summation of the magnitudes (or magnitudes to a given exponent) of the vectors.

Another object of the invention is to provide a SNR increase for sinusoidal signals in random noise.

Yet still another object of the invention is to provide an easy and rapid technique for determining the expected phase angle for a vector to be aligned with the previous two vectors.

Further, another object of the invention is to provide an easy and rapid technique for determining the expected phase angle for a rotating vector to be aligned with the previous two vectors and to do a coherent summation of the vectors.

Another object of the invention is to provide a coherent summation that can be used in digital spectrum analyzers including hardware boxes and software computer code, e.g., a fast Fourier transform (FFT).

Still further, another object of the invention is to provide a means for tracking phase rotations and to provide phase aligned data to a processor that requires phase aligned data to improve its performance.

Another object of the invention is to provide a means of increasing the SNR without having to pre-process the data to calculate phase rotations in order to align the vectors for a coherent calculation.

Yet another object of the invention is to provide a means to accomplish phase alignment of the vectors without pre-processing (i.e., on the fly).

Another object of the invention is to provide an easily implemented and computationally efficient method for producing a phase aligned coherent summation spectrogram.

Still, another object of the invention is to provide an easily implemented and computationally efficient method for producing a phase aligned vector summation spectrogramn.

SUMMARY OF THE INVENTION

The invention disclosed herein provides a computationally simple and fast method for aligning the phases of complex signals (real (in phase) and imaginary (quadrature) components) before performing a coherent (in phase components) or vector sum, thus achieving the high gains of in phase summations without pre-processing overhead to determine an optimum progression of phase shifts to enable in phase summations. The method of the invention for aligning the phases, without preprocessing to get an optimum set of phase shifts, uses the temporal relationship that exists in the phase angles of successive vectors that occur evenly spaced in time.

DETAILED DESCRIPTION OF THE PREFERRED EMBODIMENT

The phase angles of ideal (e.g., high SNR) continuous wave (CW) signals, if not exactly in the center of the frequency analysis bin, have regular rotations that are occasionally disturbed by fluctuations in phase. In other words, the signal phases will generally behave according to a predictable pattern, and deviations from that pattern will be due to phase fluctuations or due to too much noise in the bin that contains the signal. In either case, the effects will be the same. Such a predictable tendency of the signal facilitates the development of a method for aligning the phases of CW signals and for performing a phase aligned vector summation. Noise, on the other hand, has random phases that appear the same as continual phase fluctuations. The method that is used to phase align the signals will not phase align the noise, because noise has random phases with no predictable pattern. The end result will be a coherent scalar summation or a vector summation of phase aligned signals and random noises with corresponding increases in SNR.

Figure 1:
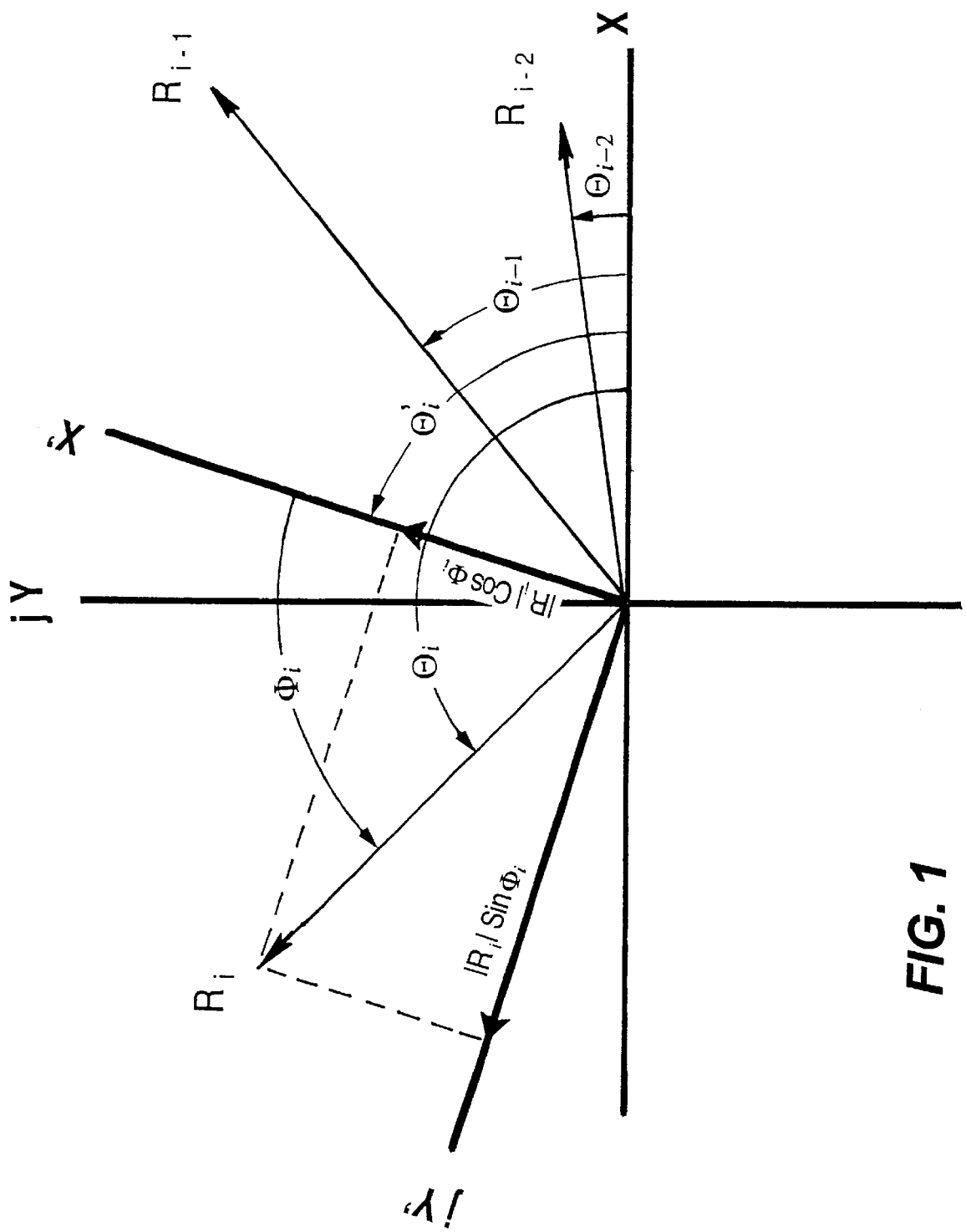
FIG. 1 is a polar representation of coordinate system and the vectors and phase angles related to a complex field, such as acoustic pressures or electrical voltages.

Referring now to the Figures, it should be seen that FIG. 1 presents a complex polar coordinate diagram whereby (j=$\sqrt{-1}$) and the diagram illustrates the phase relationships of three consecutive samples of a complex vector quantity (e.g., acoustic pressure) $R_{i-2}$, $R_{i-1}$ and $R_i$. These vectors and their corresponding phase angles $\Theta_{i-2}$, $\Theta_{i-1}$, and $\Theta_i$ can be used to define the invention for phase aligning the vectors in order to enable the enhancement various aspects of processor performance, such as SNR and spatial and spectral resolution. That is, the $R_i$ are the measured complex field vectors with corresponding phase angles $\Theta_i$. Here $\Phi_i$ is the excess phase rotation angle relative to the i th complex coordinate system X'-jY' (j=$\sqrt{-1}$) that is rotated by $\Phi'_i$ relative to the X-jY coordinate system.

It should be understood that the phase rotation of the i-2 nd vector, $R_{i-2}$, of a signal will have a uniform progression as it rotates to the next two sample positions $R_{i-1}$ and $R_i$ for uniformly sampled data. If the rotation is constant, the difference between the first two phase angles, $\Theta_{i-1}-\Theta_{i-2}$, should be equal to the difference between the second two phase angles, $\Theta_i-\Theta_{i-1}$. Hence, the second phase angle, $\Theta_{i-1}$, plus the first difference, $\Theta_{i-1}-\Theta_{i-2}$, will be the expected phase angle, $\Theta'_i$, of the i th vector. Any deviation, $\Phi_i$ (excess rotation), of the actual phase angle $\Theta_i$, from the expected phase angle, $\Theta'_i$, is a fluctuation in the phase angle, $\Theta_i$, of the vector $R_i$. Hence the set of angles $\{\Phi_i\}$ represents the phase instability or the phase fluctuations of the signal and the corresponding incoherence that accompanies fluctuations in phase. Such incoherence will degrade most coherent signal processors. The set of angles $\{\Phi_i\}$ is also the "basic building block" upon which various forms of signal processors can be developed, the simplest of which are the phase aligned vector and the coherent scalar (in phase component) summations that are used herein to illustrate the invention. This is best described below as follows:

Letting:

$$R_i = r_i e^{j\Theta_i} = r_i \cos\Theta_i + j r_i \sin\Theta_i, \qquad (1)$$

then $\Phi_i$, the excess phase rotation (EPR), can be expressed as $$EPR = \Phi_i = \Theta_i - \Theta'_i = \Theta_i - 2\Theta_{i-1} + \Theta_{i-2}, \qquad (2)$$

where $\Phi_i$ is the angle by which the $R_i$ vector is out of perfect phase alignment with the previous two vectors $R_{i-1}$ and $R_{i-2}$.

This relation permits effective phase tracking from one time step i to another, and comes from the fact that the $\Delta\theta_i$ for all i are essentially equal, e.g. $\theta_i = \theta_{i-2} + 2\Delta\theta_{i-1}$. Thus:

$$\phi_i = \theta_i - [\theta_{i-2} + 2\Delta\theta_{i-1}]$$
$$= \theta_i - [\theta_{i-2} + 2(\theta_{i-1} - \theta_{i-2})]$$
$$= \theta_i + \theta_{i-2} - 2\theta_{i-1}$$

The incoherent average (without phase aligning the vectors), designated AVGPR, of the set of vectors $\{R_i\}$ is a method that is commonly used in spectral analysis. To be consistent with notation used later, AVGPR is defined only for data vectors 3 to N (assuming the first two vectors are used only to get the starting phase angles for other methods of summation). AVGPR is, therefore, defined for purposes herein as $$AVGPR = \frac{1}{N-2}\sum_{i=3}^{N} r_i^K, \qquad (3)$$

where $r_i$=the magnitude of vector $R_i$,

N=the total number of samples, and

K=a real number (for K=2, AVGPR is the average power). Similarly, the vector average (not aligned for signal phase) of the set of vectors $\{R_i\}$ for i>2, designated VAV, is defined as $$VAV = \frac{1}{N-2}\sum_{i=3}^{N} r_i^K e^{j\Theta_i}, \qquad (4)$$

where $\Theta_i$=phase angle of the complex $R_i$ vector (Eq(1)).

The Phase Aligned Vector (PAV) average of the set of vectors $\{R_i\}$ for i>2, is defined as $$PAV = \frac{1}{N-2}\sum_{i=3}^{N} r_i^K e^{j\Phi_i}, \qquad (5)$$

where $\Phi_i$ is given by Eq (2), and the other parameters have been defined previously.

Equation (5) is a vector summation that is relative to a coordinate system (X'-jY') that is rotated by the expected phase angle $\Theta'_i$ for each i. as shown in FIG. 1. For a signal that is perfectly in-phase, all $\Phi_i$ would be equal to zero, and PAV (Eq(5)) would reduce to AVGPR (Eq (3)).

The Phase Aligned Coherent (PAC) average is different from the phase aligned vector average (PAV) average in Eq (5), which contains both the in phase (real) and the quadrature (imaginary) components. These are the $|R_i|\cos\Phi_i$ and the $|R_i|\sin\Phi_i$ terms ($|R_i|=r_i$) in FIG. 1 that give the in phase and quadrature components, respectively, relative to the rotated relative coordinate system, X'-jY'. The quadrature component ($|R_i|\sin\Phi_i$) is perpendicular to the signal direction and, therefore, would be considered entirely noise provided the axis rotation angle $\Theta'_i$ is actually aligned with the true signal phase angle. Because signal vectors will usually have some noise, the alignment will not be perfect. Hence, some degree of degradation will occur with a corresponding loss of gain.

The quadrature component is also responsible for phase fluctuations. On the other hand, the in phase component ($|R_i|\text{Cos }\Phi_i$) consists of the signal and a component of the noise that is in alignment with the signal. Variations in this in phase component appear as amplitude fluctuations. The PAC method utilizes only the in phase terms of the PAV method in Eq(5). The Phase Aligned Coherent (PAC) average is defined as $$PAC = \text{Re } [PAV] = \left| \frac{1}{N-2} \sum_{i=3}^{N} r_i^K \text{Cos}\Phi_i \right|, \quad (6)$$

where Re[PAV] denotes the real part of PAV, and the other terms in Eq (6) have been defined previously. $\Phi_i$ is the fluctuation in phase angle.

Plainly, any calculational device which can receive as input the time series Ri, and from that do the calculations described herein, can be used to practice the invention, although plainly a digital computer or the like would lend itself most readily to so doing. Also, from the foregoing it is plain that filtering results from multiplying each term in the PAV or PAC or like summations by $\text{Re}(e^{j\Phi_i})=\text{Cos}(\phi_I)$. Although multiplying the terms in the summation by 1/(N−2) is preferred to ensure that the summations scale the same as an individual time sample, 1/(N−2) is nonetheless merely a proportionality constant whichis not critical to the invention.

Figure 2:
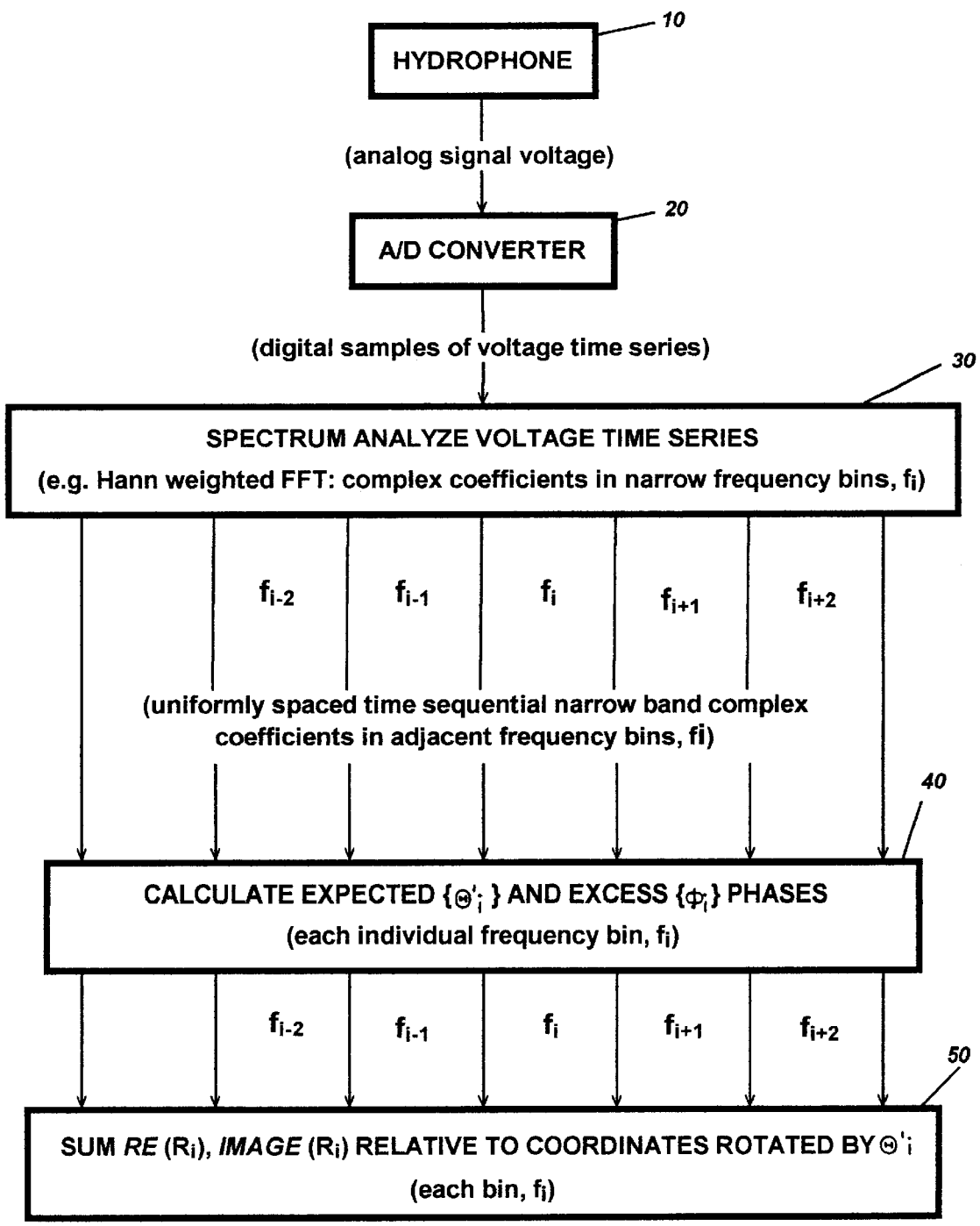
FIG. 2 shows an example functional block diagram of the invention.

FIG. 2 presents an example of a functional diagram of the process for obtaining the summation in Eq (5) to get PAV for acoustic data measured by a hydrophone or other like sensor. The analog signal voltage measured by a hydrophone (10) is fed into an analog-to-digital (A/D) converter (20) to get a corresponding temporal series of voltages. The time series is sampled and spectrum analyzed by a fast Fourier transform (FFT) to get complex coefficients in narrow frequency bins (30). Successive FFT's are performed at uniform time intervals to obtain time series of complex coefficients at even time intervals in each frequency bin. Using those complex coefficients in each bin separately, the sets of expected phase rotations $\{\Theta'_i\}$ and the set of actual phase rotations $\{\Theta_i\}$ are determined and used to calculate the set of excess phase rotations, $\{\Phi_i\}$ for that bin (40). The Cosines of the excess phase rotations, a measure of the effect of not being in perfect phase alignment, times their corresponding magnitudes squared (for this example) are averaged to give the PAV value for that frequency bin. The result for all bins combined is a phase aligned average power spectrum (50).

The PAC summation in Eq (6) differs from the incoherent AVGPR summation (ignoring phase) in Eq (3) only by the individual Cosine reduction factors caused by the excess rotation phase angle $\Phi_i$. If the signal was perfectly coherent, the $\Phi_i$ terms would all be equal to zero, and the Cosine of zero is equal to unity. There would be no reduction in the signal, in that case. Hence, for a perfectly coherent signal, the PAC and AVGPR results will be identical. Noise, on the other hand, has random phase angles with $\Phi_i \gg 0$ for most i. Therefore, the noise values for the PAC method (Eq (6)) will always be less than the corresponding values for AVGPR. The VAV method (Eq (4)), on the other hand, averages the unaligned real components and the unaligned imaginary components separately to determine an unaligned vector average. As the individual vectors rotate, the real and imaginary components add and subtract (reinforce and cancel) and the real and imaginary averages approach zero as N becomes large. The net effect is that the unaligned vector average (VAV) for both signal and noise will generally be significantly reduced compared to the incoherent average (AVGPR), which will always be the largest of the four types of averages.

The Phase Aligned Vector (PAV) average will suppress the noise like the VAV method but be more like the AVGPR method for signal. Hence it will have a larger SNR than the other two methods. The Phase Aligned Coherent (PAC) average of the noise will be next in magnitude to the AVGPR average and greater than the PAV and VAV methods.. However, the PAV method will have a larger SNR for sinusoidal (CW) signals, because the unaligned signal in the VAV average will rotate and reinforce and cancel, but in the PAV method it will mostly reinforce.

Figure 3A:
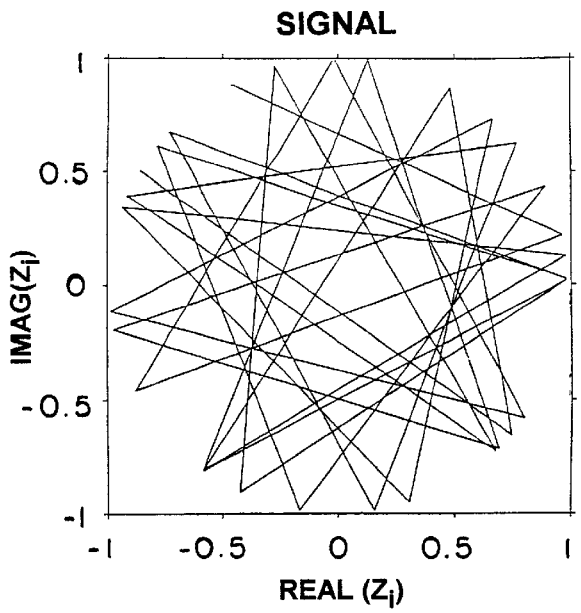
FIGS. 3a,b show Argand diagrams.
Figure 3B:
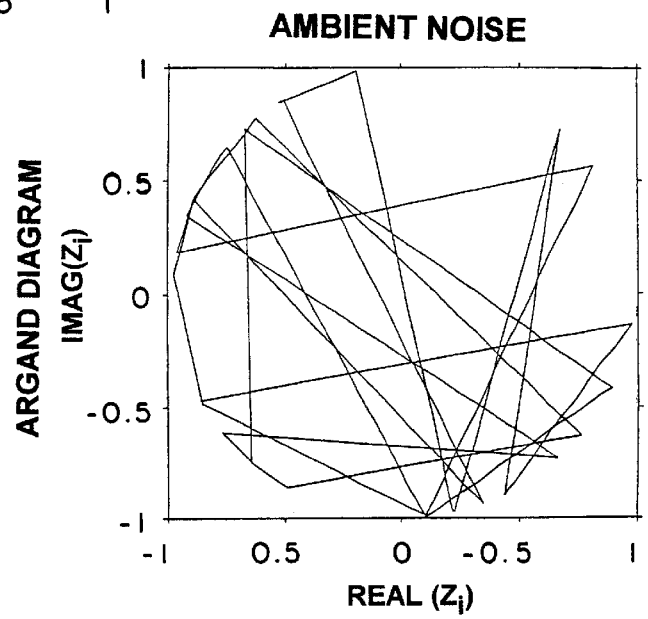
FIGS. 3c,d show excess phase plots.
FIGS. 3e,f show plots of the averaging method using a typical signal bin in FIG. 3e and for a typical ambient noise bin FIG. 3f.

Referring now to the drawings shown in FIGS. 3a–3f, it should be seen that differences in the phase rotations of unit phasors with phase angles $\Theta_i$ are illustrated by the plots. In FIGS. 3a,b, plots are of Argand diagrams ("ARGAND"), which plot on a rectangular coordinate system the imaginary component (IMAG) of the unit phasor versus the real (REAL) component. The resulting points on the plot are then connected by straight lines. The lengths of the lines increase as the differences between the phase angles of the two corresponding adjacent unit phasors increase. The first Argand diagram is for a typical signal, and the other diagram is for typical ambient noise from the same data set as the signal.

When the two Argand diagrams in FIGS. 3a,b are compared, they both appear to have the lines randomly distributed over the surface of the plot, much like one would expect for noise, which has random phases. However, upon closer inspection, the first plot is seen to have a fairly uniform distribution of lines across the surface of the plot, with all of the lengths nearly the same. This means that the phase shifts between adjacent vectors are all almost the same. Such behavior is not random, and therefore, could not be noise. Only signal could behave in such a regular and deterministic manner. Furthermore, without significant variations in the lengths, there can not be significant phase fluctuations, which further identifies it as a signal and not as noise.

Figure 3C:
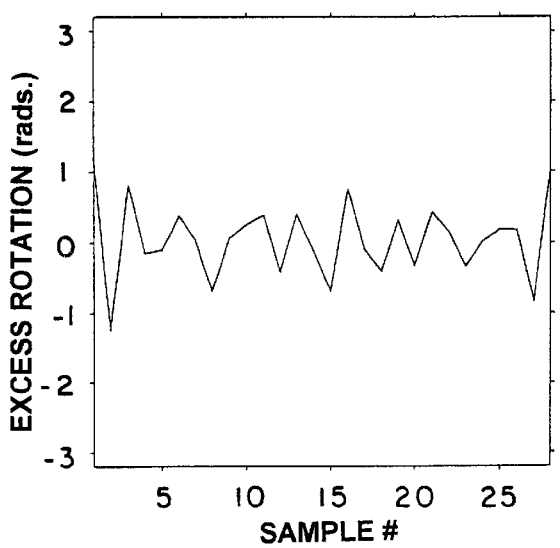
Figure 3D:
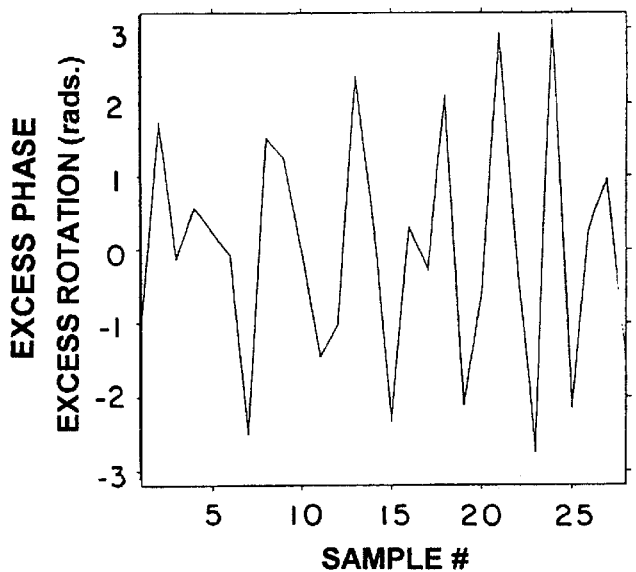

As illustrated in the drawings of FIGS. 3c,d, the basic nature of the excess phase rotation angle $\Phi_i$ is illustrated as ("EXCESS PHASE") for the same signal and noise bins as previously discussed for the corresponding Argand diagrams in FIGS. 3a,b. The horizontal axes of these plots are indicated as SAMPLE #, and the vertical axes are indicated as EXCESS ROTATION ($\Phi_i$) in radians.

EXAMPLE 1

The plots were obtained from data obtained by a 144 hydrophone towed horizontal line-array sonar system in the ocean. Each hydrophone was sampled at 200 Hz, spectrum analyzed by non-overlapping Hann shaded FFT's to produce narrow band spectra and beamformed by a spatial discrete Fourier transform (DFT) to produce complex narrowband spectra in 256 spatial steering directions. The input for the invention used in this illustration are two sets of consecutive beam-frequency cell outputs evenly spaced in time, one of signal and one of noise. The input to the invention could also be similar complex data from a single hydrophone or any other type of sensor that gives complex spectra, such as voltages out of electronic equipment and electric field sensors. The input could be any other system of complex variables for which a phase angle can be identified and those variables with more regular phase behavior are to be detected among the others or summed to get a preferential "coherence" gain.

The traces of $\Phi_i$ verses sample number in the excess phase rotation plot for signal verses sample number in FIG. 3 are generally confined between 1 rad and −1 rad (one exception is the second sample in the first plot). Hence, the excess phases are generally less than 57.3 deg (1 rad) for the signals. Such excess phases would provide Cosine multiplication factors in Eq (6) of about 0.54 and greater, which represents a reduction of (1.0−0.54)×100 or 46% or less reduction. In all cases of the excess phases in the signal plot, the angles are less than $\pi/2$ a rad (1.57 rad), which makes the Cosine term in Eq (6), always positive and additive.

The trace for the excess phase in the plot for the bin containing ambient noise in row two is not concentrated at low angles as it was for the bin that contain the signal. The trace covers the full range of angles, as would be expected of noise which has random phase angles. In this cases as for noise in general, the full range of angles from 0 to $\pi$ rad (0° to 180°) and 0 to $-\pi$ rad (0° to −180°) are included in the summation of Eq (6) and the Cosine terms will include both positive and negative values. Hence, reinforcement (addition) and cancellation (subtraction) will generally take place in both the complex noise summation of Eq (5) and the scalar summation of Eq (6), while the bins containing the signals will generally experience more additions (reinforcement) than subtractions (cancellation). However, as the signal-to-noise ratio (SNR) in a bin decreases, the phase characteristics of the bin will be progressively dominated by the noise, and at some low value of SNR, the influence of the signal on the excess phase will no longer be detectable. The noise will then be the dominant component, and the presence of the signal in the bin will not be detected.

Figure 3E:
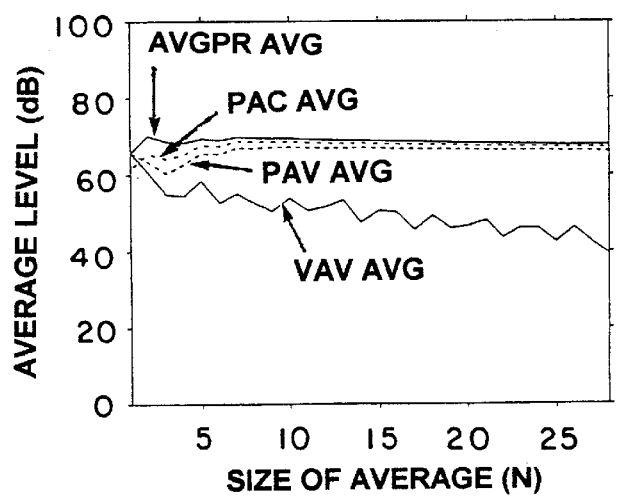
Figure 3F:
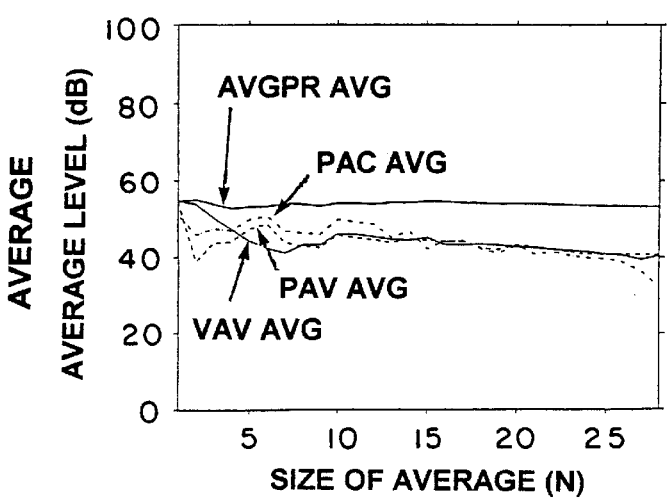

In FIG. 3e and FIG. 3f, plots of ("AVERAGE") versus ("SIZE") are shown. These plots compare the results of averaging the complex vectors according to the magnitude squared averaging technique in Eq (3), designated AVGPR AVG (solid top line), the Phase Aligned Coherent averaging technique in Eq (6), designated PAC AVG (top dashed line), the Phase Aligned Vector averaging technique in Eq (5), designated PAV AVG (bottom dashed line), and the vector addition averaging technique in Eq (4), designated VAV AVG (,bottom solid line). Each point on a given curve represents a complete summation for the particular number of samples (N) at which the point is plotted. Such curves give the levels (10 times the Log) of the values calculated by Eqs (3), (4), (5) and (6) for a given size of average and illustrate the amount of gain or suppression a given averaging technique has for signal and for noise relative to the other techniques.

The first "AVERAGE" plot for signal for average sizes greater than 10 shows that the phase aligned coherent results for PAC and the phase aligned vector results for PAV are nearly identical to the incoherent AVGPR results, which indicates that the phase alignment technique in Eq (2) is successfully aligning the successive complex vectors, such that the quadrature (Sine) terms in Eq (5) are nearly zero and the Cosine (in phase) terms in Eq (5) and Eq (6) are nearly unity. The incoherent sum, AVGPR, will always give the highest output of the four techniques. Hence, it is desirable for the phase aligned sum for the bins containing the signal to be nearly equal to the incoherent sum (phase aligned results are about 1 to 2 dB less than the corresponding AVGPR results), but if that is also the case for noise there will not be a SNR gain. The corresponding curves for the vector average VAV (bottom solid curve) are suppressed, relative to the other three curves, by as much as 27 dB (a factor of 500) for 28 samples (size N of average). That extreme suppression is a result of the complex vectors rotating by an uncompensated amount from one sample to the next. As a result, the signal vectors will go through periods of being in phase and out of phase and in between phase with corresponding reinforcement and cancellation. If the purpose of the processing is to maximize the output value, then the vector sum VAV would not be the best choice, the AVGPR (magnitude squared (incoherent) sum) the PAC, and the PAV phase aligned methods gave considerably higher values (about 20 dB for an average size of 25).

In many cases, it is more important to maximize the SNR than it is to just maximize the processor output. Hence, the challenge is to increase the output for the bin containing the signal as much as possible, while decreasing the output for the noise only bins as much as possible. The results for the "AVERAGE" plots for the noise show that the output of the phase vector aligned sum PAV (Eq (5)) and the phase aligned Coherent sum PAC (Eq (6)) suppress the noise output relative to the corresponding incoherent sum (Eq (3)) by up to 15 dB (up to 15 dB noise suppression minus 2 dB signal suppression) and more for N greater than 28. This is a SNR gain for the PAC and PAV sums relative to the (AVGPR) incoherent sum that increases to approximately 13 dB for N equal to 28, and is expected to increase as N becomes larger. The corresponding comparison for the vector sum VAV, relative to the AVGPR sum, indicates that a reduction in the SNR is the result.

Figure 4:
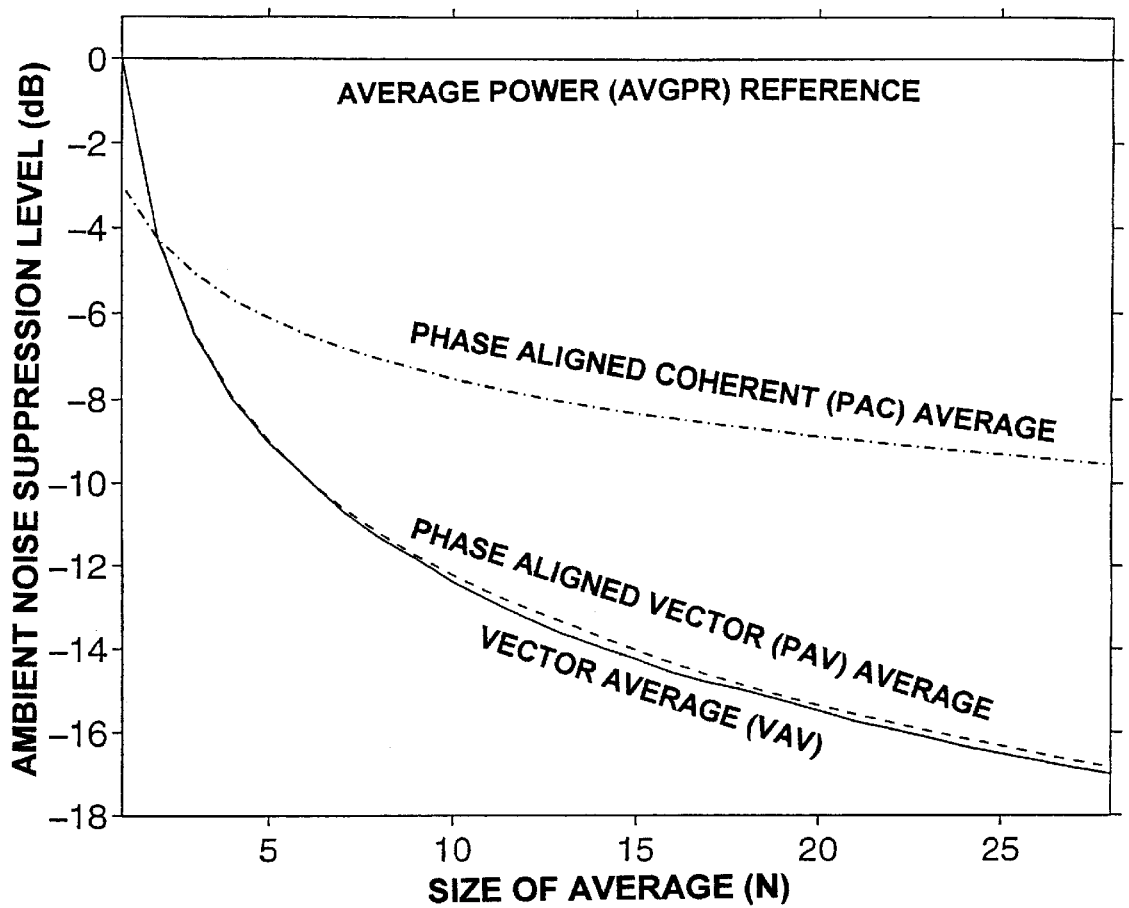
FIG. 4 illustrates average ambient noise suppression levels of the Phase Aligned Coherent (PAC) average (dash-dot curve), the Phase Aligned Vector (PAV) average (dashed curve above bottom solid curve), and the unaligned vector (VAV) average (solid curve at the bottom) relative to the average of the magnitudes squared (0 dB reference line, AVGPR average).

The results in FIG. 4 illustrate the average suppression levels of the ambient noise due to the PAC, PAV, and VAV averaging methods versus the size of the average. These results are presented as suppression levels relative to the corresponding AVGPR levels as a well known reference. In the case of these results, the magnitudes squared ($r_i^2$) were used in all averages. The differences between the AVGPR result for a given size of average and the corresponding results from the other three methods were averaged over more than $1.6\times10^5$ frequency-beam number cells (640 frequency bins by 256 beams). The results in FIG. 4 also show that, on the average, the phase aligned coherent average (PAC), suppresses the noise more than the AVGPR average by as much as 9 dB for averages up to a size of 28. On the other hand, the vector average without prior phase alignment (VAV) and the vector average with phase alignment (PAV) both suppress the noise more than the AVGPR method as much as 17 dB for the same number of averages. For a perfectly phase aligned signal in this type of noise (underwater ambient noise) the signal suppression of the PAC and PAV methods would be zero, which would give a SNR gains relative to the AVGPR method of as much as 9 dB for the PAC method and 17 dB for the PAV method. Note that the AVGPR method does not distinguish between and noise and signal, since it uses only magnitude and ignores phase. The VAV method has very good suppression of the noise like the PAC method, because of the random phases of the noise. On the other hand, the SNR gain of the VAV method could be negative relative to the AVGPR method because of the cancellations in the unaligned vector average that are caused by the misalignment of the rotating signal vectors. That is an important reason that the VAV average is usually not used.

Figure 5A:
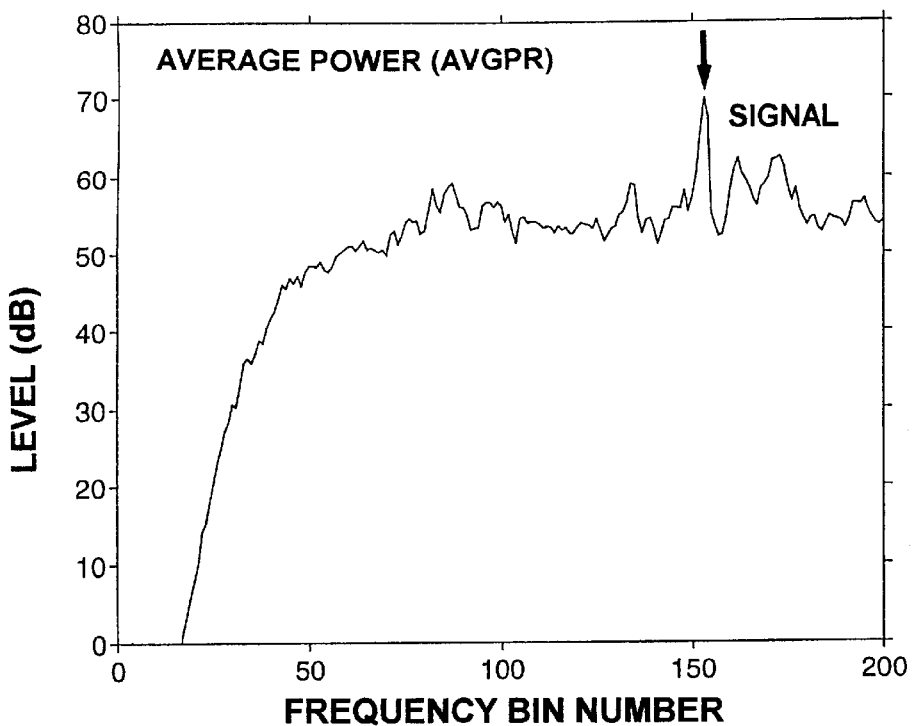
FIGS. 5a–d illustrate power level versus frequency bin number for a) the average of the magnitudes squared (AVGPR), b) the Phase Aligned Coherent (PAC) average, c) the Phase Aligned Vector (PAV) average, and d) the vector average (VAV), respectively.
Figure 5B:
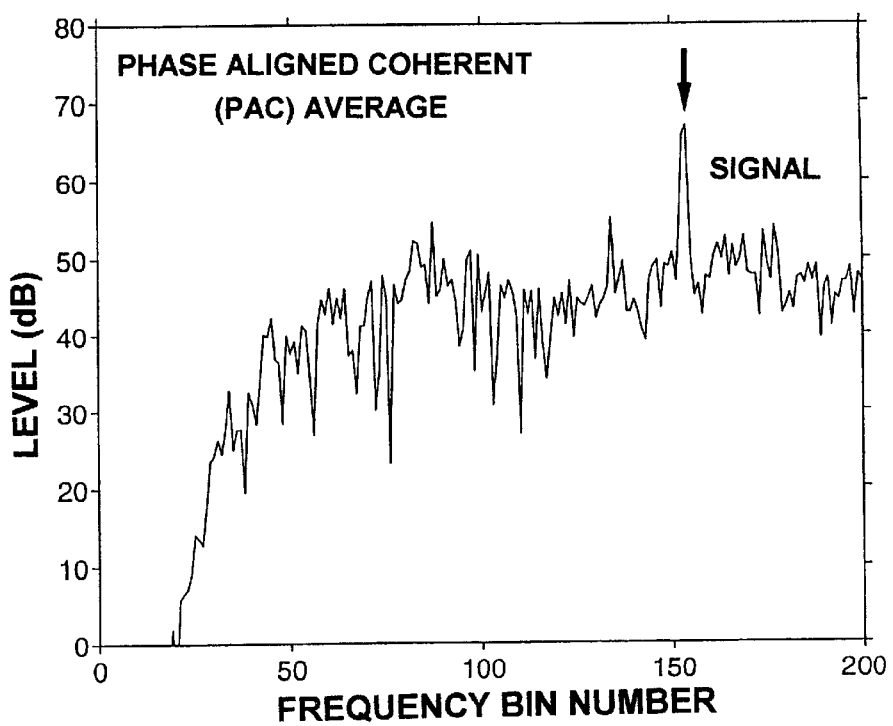
Figure 5C:
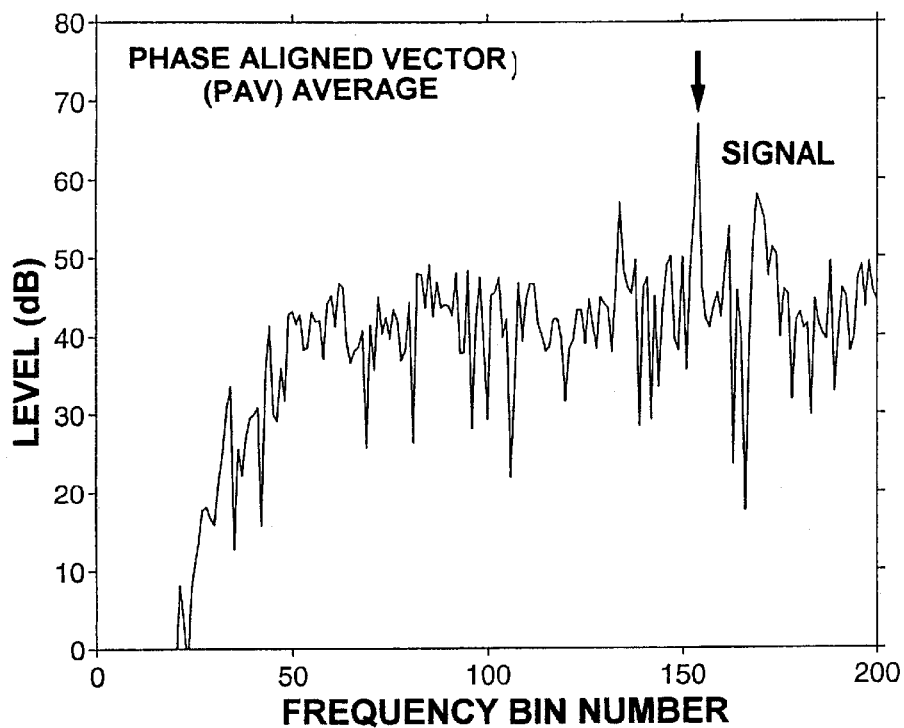

FIGS. 5a–c present frequency spectra for each of the four averaging methods utilized on the same data set of underwater acoustic complex pressures measured at the output of a discrete Fourier transform (DFT) beamformed. The beamforming process involves a set of Hann weighted FFT's being applied to the voltage output of 144 hydrophones of a towed line-array sonar to produce complex pressure coefficients in narrow frequency bins, which were then Hann shaded and a DFT performed across the 144 complex pressures in a given frequency bin for a particular steering angle. The result for that frequency bin and steering angle is a complex pressure. The corresponding set of complex pressures for all frequency bins constitutes a frequency spectrum. That process was repeated for 30 contiguous FFT's. The resulting complex coefficients were used as the input data for the various averaging methods (with K=2 and N=30) to produce the results in FIG. 5.

FIG. 5a presents the spectrum that was produced by the AVGPR averaging method. The arrow identifies the frequency bin number of a signal, frequency bin number 154. The performance of the other averaging methods will be compared on the basis of the SNR that is achieved by the AVGPR method, which is designated the standard for comparison.

Figure 5D:
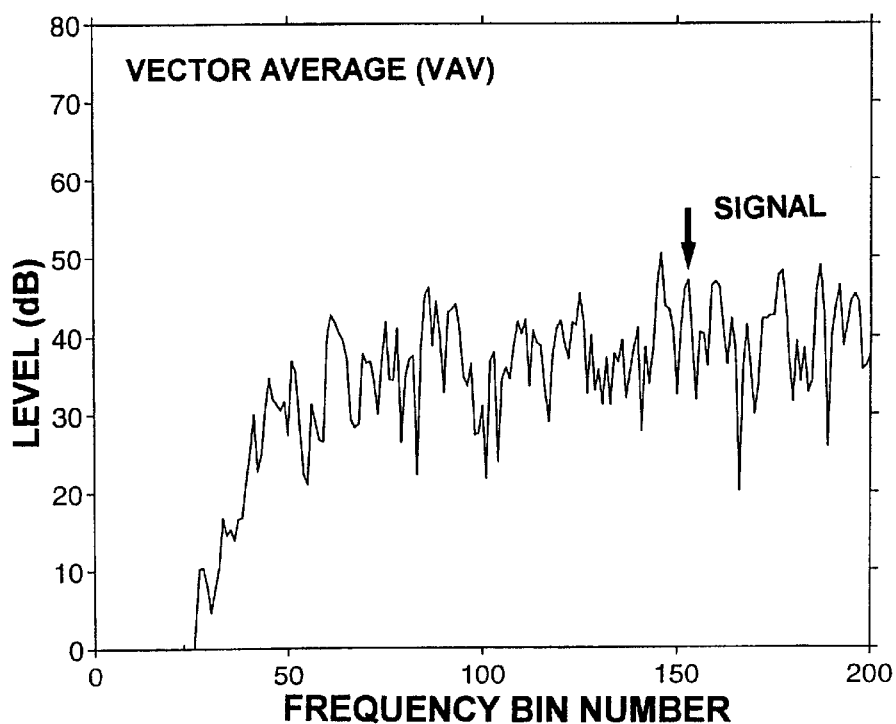

FIGS. 5b, 5c, and 5d present frequency spectra for the PAC, PAV, and the VAV averaging methods, respectively, that correspond to the AVGPR spectrum in FIG. 5a. The SNR for the signal in the AVGPR results is approximately 12 dB. It is about 16 dB for the PAC results, and about 20 dB in the PAV results. The signal has been attenuated about 22 dB by the VAV method and has a SNR of about 0 dB. The reason for such severe attenuation is believed due to the unaligned phase rotation of the pressure vectors causing severe cancellation and reinforcement in the unaligned vector average.

The various averaging methods in FIG. 5 can also be compared on the basis of how robust the method is to smearing the results across frequency bins. Starting with the signal, it is evident that the PAV method has the least smearing, and the PAC method is next in line. In the VAV method, it is difficult to distinguish the signal from the noise in order to arrive at a meaningful conclusion. Next, the comparison can be on the basis of smearing the noise. In this case, the AVGPR method clearly smears the noise more than the other methods. For some signal processing objectives, that may be a desirable result, such as producing a smoother background for detection. For other objectives, such as maximizing the SNR or enhancing the resolution, the AVGPR method may not be the best method. The robustness to smearing by the other three methods is approximately equal to each other, and significantly better than that of the AVGPR method.

In sum, it should be seen that the present invention provides for a new and unobvious method of aligning rotating vectors by using the previous two vectors to get an expected rotation, and an excess rotation that corresponds to the component that is out of alignment. Another feature is identifying signals among noise. Another new feature is identifying a signal when the SNR is too low for the average power summation to detect it. Still a further feature is detecting a phase stable signal in an unalerted manner and providing a relative measure of the phase stability of vectors. An advantage of the invention is that once three vectors have been used to get the first excess rotation, additional excess rotations can be obtained from each additional vector. Another advantage is the invention can operate on as few as three vectors. Still another advantage is that the invention can provide a phase aligned average with as little as three data points (i.e., vectors) to produce an output such as a gram. Yet still another advantage is that the data need not be pre-processed to first determine a vector rotation and that little needs to be known about the frequencies and rotations of the vectors. Finally, another advantage is the simplicity of the phase alignment mathematics and its computational efficiency.

By the foregoing, an improved method of signal processing has been disclosed. However, numerous modifications and substitutions may be had without departing from the spirit of the invention. For example, one alternative to the invention is to guess a given rotation, calculate a vector sum and an incoherent sum, and the difference between the two sums and systematically repeat that for other guesses, and use the guessed rotation that had the least difference. Another alternative would be to track the phase rotation over all or a significant part of the vectors, reprocess the data using the average rotation, and accept whatever error there is. Another alternative would be to use the technique described by A. E. Leybourne in Library of Congress Publication No. ISSN 1067-0688 of September 1997, which discloses a computer intensive method, which has only been shown to work on simulated data. Finally, another alternative that is the most often one used is the incoherent sum, and the additional gains that could be achieved by the more difficult and time consuming phase aligned vector calculation would be forfeited.

Accordingly the invention has been described by way of illustration rather than limitation.

What is claimed is:

1. A method for determining whether a signal is noise or is a signal to be tracked, comprising the steps of:

receiving three consecutive samples of said signal, each sample having a phase angle;

comparing said three consecutive phase angles, said comparing including defining excess phase rotation (EPR) as:

$$EPR = \Phi_i = \Theta_i - 2\Theta_{i-1} = \Theta_{i-2},$$

where $\Theta_i$ i is the phase angle of said third sample, $\Theta_{i-1}$ is the phase angle of said second sample, and $\Theta_{i-2}$ is the phase angle of said first sample; and using the compared phase angle values to determine whether a signal is noise or is a signal to be tracked.

2. A method for determining whether a signal is noise or is a signal to be tracked, comprising the steps of:

receiving three consecutive samples of said signal, each sample having a phase angle;

comparing said three consecutive phase angles; and using the compared phase angle values to determine whether a signal is noise or is a signal to be tracked, and wherein an ith sample is represented by the complex vector $$R_i = r_i e^{j\Theta_i} = r_i \cos\Theta_i + jr_i \sin\Theta_i,$$

wherein $r_i$ is the magnitude of vector $R_i$.

3. A method as in claim 2 wherein said first and second samples are used to establish starting phase angles.

4. A method as defined in claim 2 wherein said third sample and any succeeding sample are processed using an incoherent average.

5. A method as defined in claim 4 wherein said third sample and any succeeding sample are processed using an incoherent average defined by $$AVGPR = \frac{1}{N-2}\sum_{i=3}^{N} r_i^K,$$

where
N=the total number of samples, and
K=a real number (for K=2, AVGPR is the average power) and, the vector average (not aligned for signal phase) of the set of vectors $\{R_i\}$ for i>2, designated VAV, is defined as $$VAV = \frac{1}{N-2}\sum_{i=3}^{N} r_i^K e^{j\theta_i}.$$

6. A method as defined in claim 5 wherein a phase aligned vector (PAV) average is defined for the set of vectors $\{R_i\}$ for i>2 as $$PAV = \frac{1}{N-2}\sum_{i=3}^{N} r_i^K e^{j\Phi_i}.$$

7. A method as defined in claim 6 wherein the phase aligned vector (PAV) average is a vector summation that is relative to a coordinate system (X'–jY') that is rotated by the expected phase angle $\Theta_i$ for each i.

8. A method as defined in claim 4 wherein said third sample and any succeeding sample are processed using an incoherent average defined by $$AVGPR = \frac{1}{\text{constant}}\sum_{i=3}^{N} r_i^K, \text{ and}$$

the vector average (not aligned for signal phase) of the set of vectors $\{R_i\}$ for i>2, designated VAV, is defined as $$VAV = \frac{1}{\text{constant}}\sum_{i=3}^{N} r_i^K e^{j\theta_i}$$

where
K=a real number (for K=2, AVGPR is the average power), and
$r_i$=the magnitude of vector $R_i$.

9. A method as defined in claim 8 wherein a phase aligned vector average is defined for the set of vectors $\{R_i\}$ for j>2, as $$PAV = \frac{1}{\text{constant}}\sum_{i=3}^{N} r_i^K e^{j\Phi_i},$$

where $\Phi_i = \Theta_i - 2\Theta_{i-1} + \Theta_{i-2}$. $\Theta_i$ is the phase angle of said third sample, $\Theta_{i-1}$ is the phase angle of said second sample, and $\Theta_{i-2}$ is the phase angle of said first sample.

10. A method as defined in claim 9 wherein said phase aligned vector (PAV) average is a vector summation that is relative to a coordinate system (X'–jY') that is rotated by the expected phase angle $\theta_i'$ for each i.

11. A method for determining whether a signal represents noise or represents a signal to be tracked, comprising:

receiving input data from a sensor, taking at least three samples of said input data at uniform time increments, transforming said samples by spectrum analysis into a form such that each $i^{th}$ sample is represented by a complex vector $R_i$ having a magnitude $r_i$ and a phase angle $\theta_i$, wherein $R_i = r_i e^{j\theta_i} = r_i \cos\theta_i + j\, r_i \sin\theta_i$, and comparing said three consecutive phase angles.

12. A method for determining whether a signal represents noise or represents a signal to be tracked, comprising:

receiving input data from a sensor, taking at least three samples of said input data at uniform time increments, transforming said samples by spectrum analysis into a form such that each $i^{th}$ sample is represented by a complex vector $R_i$ having a magnitude $r_i$ and a phase angle $\theta_i$, wherein $R_i = r_i e^{j\theta_i} = r_i \cos\theta_i + j\, r_i \sin\theta_i$, and defining the excess phase rotation (EPR) according to the function EPR=$\Phi_i = \theta_i - 2\theta_{i-1} + \theta_{i-2}$, where $\theta_i$ is the phase angle of said third sample, $\theta_{i-1}$ is the phase angle of said second sample, and $\theta_{i-2}$ is the phase angle of said first sample, and processing said third sample and any succeeding samples according to $$VAV = \frac{1}{\text{constant}}\sum_{i=3}^{N} r_i^K e^{j\theta_i},$$

where N=total number of samples and K=a real number.

13. A method for determining whether a signal represents noise or represents a signal to be tracked, comprising:

receiving input data from a physical sensor, taking at least three samples of said input data at uniform time increments, transforming said samples by spectrum analysis into a form such that each $i^{th}$ sample is represented by a complex vector $R_i$ having a magnitude $r_i$ and a phase angle $\theta_i$, wherein $R_i = r_i e^{j\theta_i} = r_i \cos\theta_i + j\, r_i \sin\theta_i$, defining the excess phase rotation (EPR) according to the function EPR=$\Phi_i = \theta_i 2\theta_{i-1} + \theta_{i-2}$, where $\theta_i$ is the phase angle of said third sample, $\theta_{i-1}$ is the phase angle of said second sample, and $\theta_{i-2}$ is the phase angle of said first sample, and processing said third sample and any succeeding samples according to $$PAV = \frac{1}{\text{constant}}\sum_{i=3}^{N} r_i^K e^{j\Phi_i},$$

where N=total number of samples and K=a real number.

14. A method as in claim 2, wherein the method utilizes a Phase Aligned Coherent (PAC) average that is defined as $$PAC = \text{Re}\,[PAV] = \left| \frac{1}{N-2}\sum_{i=3}^{N} r_i^K \cos\Phi_i \right|,$$

wherein $\Phi_i = \Theta_i - 2\Theta_{i-1} + \Theta_{i-2}$ where $\Theta_i$ is the phase angle of said third sample, $\Theta_{i-1}$ is the phase angle of said second sample, and $\Theta_{i-2}$ is the phase angle of said first sample, and wherein K=a real number.

* * * * *